United States Patent

[11] 3,599,492

[72] Inventors Henry P. Kalmus;
 Billy M. Horton, both of Washington, D.C.
[21] Appl. No. 854,472
[22] Filed Sept. 2, 1969
[45] Patented Aug. 17, 1971
[73] Assignee The United States of America as represented by the Secretary of the Army

[54] COAXIAL GRAVITY METER
 8 Claims, 4 Drawing Figs.
[52] U.S. Cl. .................................................. 73/382
[51] Int. Cl. ................................................... G01v 7/00
[50] Field of Search ........................................ 73/382

[56] References Cited
 UNITED STATES PATENTS
 3,336,806 8/1967 Kalmus ......................... 73/382

Primary Examiner—Richard C. Queisser
Assistant Examiner—Herbert Goldstein
Attorneys—Harry M. Saragovitz, Edward J. Kelly, Herbert Berl and J. D. Edgerton ABSTRACT: A gravity meter having two masses which are both fixed to independently rotate about the same axis. Strain gauges are connected from one mass to its center of rotation to detect centrifugal and gravitational forces acting on the mass and the angular velocities of both masses are adjusted to provide an AC null in the output of the strain gauges. When such a null is attained, the centrifugal force developed by the masses balances the force due to gravity. Since the angular velocities of the masses are directly related to the centrifugal force, a measurement of the angular velocity provides a measure of gravity.

PATENTED AUG 17 1971

INVENTORS
Henry P. Kalmus
BY Billy M. Horton

ATTORNEYS

PATENTED AUG 17 1971

INVENTORS
Henry P. Kalmus
BY Billy M. Horton

ATTORNEYS 3,599,492

COAXIAL GRAVITY METER

BACKGROUND OF THE INVENTION

The invention described herein may be manufactured and used by or for the Government of the United States of America for governmental purposes without the payment to us of any royalty thereon.

This invention relates to gravity meters, and more particularly to a dynamic gravity meter which utilizes centrifugal force of a magnitude that may be accurately determined with great precision to balance the gravitational forces to be measured.

A precursor of the present invention is described in U.S. Pat. No. 3,336,806, issued Aug. 22, 1967, to Kalmus and the disclosure of that patent is incorporated herein by reference.

In that patent, the state of the art of gravity measurement devices is summarized and three types of gravity meters, i.e., dynamic gravity meters, stable gravity meters and astatized gravity meters, are described. These prior art gravity meters are subject to a number of disadvantages, e.g., the tendency to be subject to zero drift, the necessity to be calibrated frequently and the propensity to be affected by variations in temperature and pressure. As a result, great care must be exercised in selecting materials with low-temperature coefficients and continual barometric readings must be made to compensate for the effect of the density of the air. Alternatively, the mass systems of these prior art gravity meters could be placed in a sealed or evacuated chamber. Additionally, in almost all cases these gravity meters are extremely sensitive and subject to misalignment precluding their use in an adverse environment such as in aircraft or ships.

The gravity meter described in the above-noted Kalmus patent obviated these aforementioned disadvantages of prior art gravity meters by providing a dynamic gravity meter which utilizes two rotating masses. A first mass is rotated about a fixed point and a second mass is rotated about the first mass. A strain gauge in the radius arm of the first mass and connected between the fixed point and the mass detects the internal forces resulting from the rotation of the masses and the angular velocities of both masses are regulated to provide an AC null in the output of the strain guage.

In that Kalmus gravity meter, two radius arms are employed, one to connect the first mass to the fixed point and the other to connect the second mass to the first mass. Of necessity this gravity meter requires sufficient space to permit the rotation of both masses. Additionally, that device, in order to reduce the main bearing load, requires that the system be balanced by providing an equal mass system extending from the fixed point on an extension of the radius arm for the first mass. The extension of the mass system thus increases the space requirements for the gravity meter.

It is therefore an object of the present invention to provide an improved dynamic gravity meter which having once been calibrated permits the absolute measurement of gravity repeatedly without recalibration.

It is another object of the present invention to provide an improved dynamic gravity meter in which a force due to gravity is continually compared with an accurately measureable centrifugal force by an AC null method.

It is a further object of the present invention to provide an improved gravity meter which is relatively insensitive to variations in temperature and pressure.

SUMMARY OF THE INVENTION

According to the present invention, the foregoing and other objects and advantages are attained by providing a gravity meter having two masses which are both rotated independently about the same axis. Strain gauges are connected between one of the masses and the central axis of rotation to measure the resultant internal forces acting on the rotating mass. The angular velocities of both masses are adjusted to provide an AC null in the output of the strain gauges, and when such a null is attained, the centrifugal force developed by the rotating masses balances the force due to gravity. Since the angular velocity is directly related to the centrifugal force, a measurement of the angular velocity provides a measure of gravity.

DESCRIPTION OF THE PREFERRED EMBODIMENT

Figure 1:
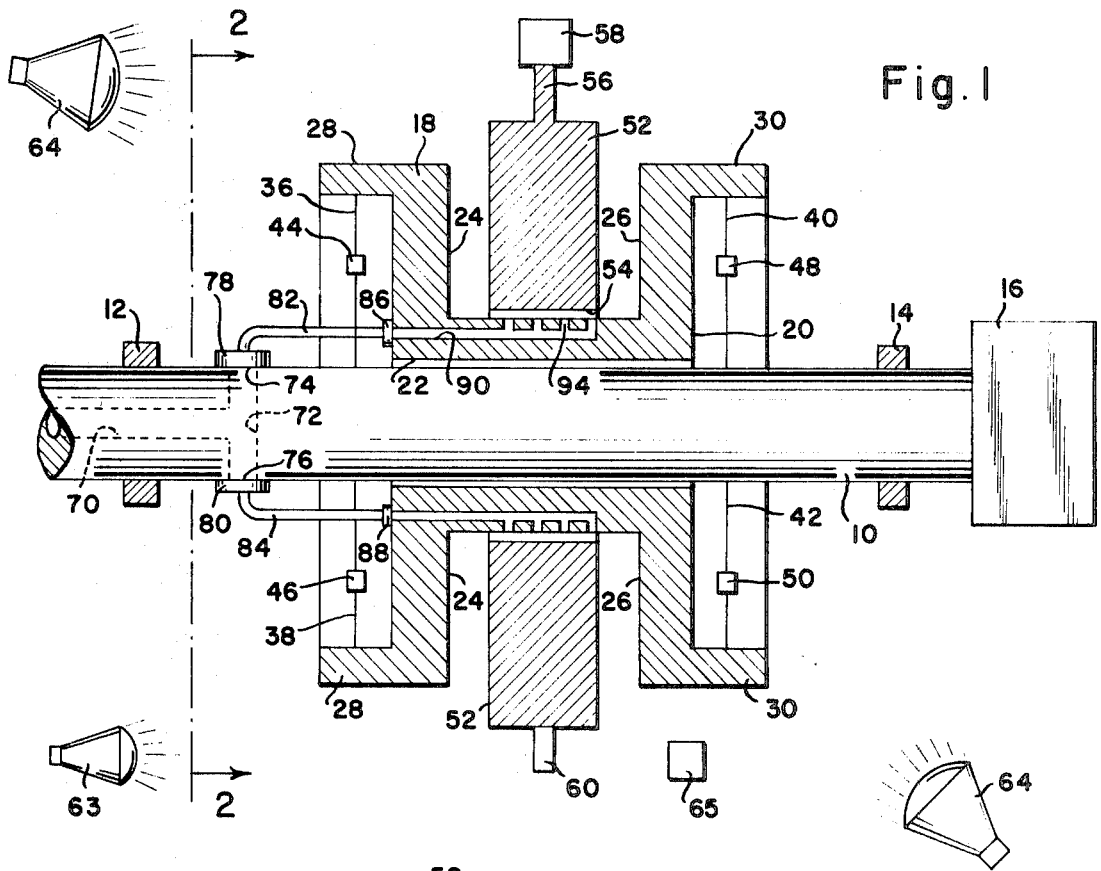
FIG. 1 is an elevational view, partly in section, showing a diagrammatic representation of the present invention.
Figure 2:
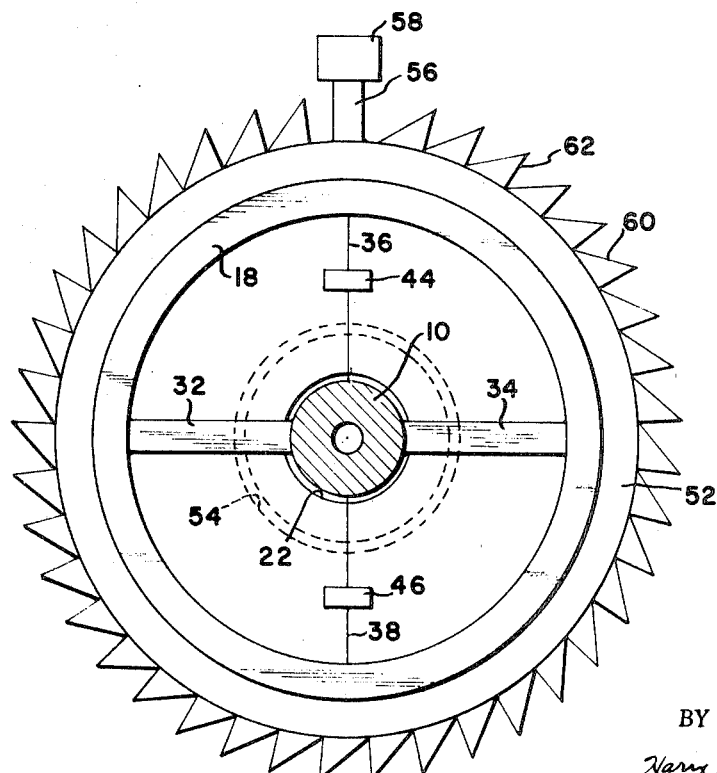
FIG. 2 is a vertical sectional view taken on line 2-2 of FIG. 1.

Referring now to the drawings, wherein like reference numerals designate identical or corresponding parts throughout the several views, and more particularly in FIG. 1 a shaft 10 is shown rotatably mounted in bearing members 12 and 14. A variable speed motor 16, coupled to shaft 10 provides a power source to rotate shaft 10 at a controlled rate. A rotor 18 having a hub portion 20 with a bore 22 therethrough and radially extending flanges 24 and 26 with axially extending lip segments 28 and 30, respectively, is concentrically disposed about shaft 10. The diameter of bore 22 is slightly greater than the diameter of shaft 10 and, hence, rotor 18 fits freely over shaft 10. Rotor 18 is coupled to shaft 10 by means of opposed pairs of radially extending ribs 32 and 34, respectively, (see FIG. 2 as well) and single opposed wire strands 36—42 which are fixed between the peripheral surface of shaft 10 and the lip segments 28 and 30. Strain gauge transducers 44—50 are mounted, respectively, in each of the four single strands 36—42 to record the centrifugal forces acting on rotor 18 when it is rotated.

The opposed pairs of ribs 32 and 34 are sufficiently rigid to support the rotor 18 so that motion of rotor 18 only in the direction of wires 36 and 38 is permitted.

Concentrically disposed about hub 20 of rotor 18 is a second rotor 52 having a bore 54 of a larger diameter than the outside diameter of hub 20 so that rotor 52 is free to rotate relative to rotor 18. An extension arm 56 extends radially outwardly from the periphery of rotor 52 and supports an eccentric weight 58.

Rotors 18 and 52 are driven independently so that each may rotate relative to the other. Rotor 18, since it is fixed to shaft 10, is driven by variable speed motor 16. Rotor 52 may be driven in any convenient manner, i.e., reaction jets of air, synchronous electric motors or pressure gearing, but preferably by an optical drive system. To utilize an optical drive system the periphery of rotor 52 is provided with a sawtooth configuration comprising a plurality of circumferentially spaced sawtooth-shaped protrusions 60 with each sawtooth protrusion having a radially directed rear surface 62 which is blackened so as to absorb radiation while all other surfaces of the protrusion are highly polished so as to reflect radiation.

The rotor chamber is uniformly flooded with light in all directions from a number of light sources 64. The reactive force of the gas molecules near the blackened surfaces which absorb radiation emitted by light sources 64 make the rotor advance in a direction opposite to that of a cutting sawtooth blade. The speed and phase angle of the rotor are controlled by changing the intensity of the illumination, hence, the intensity of the radiation, emanating from light sources 64.

To determine the speed of rotation and phase angle of rotor 52 a light source 63 is positioned so that its beam of light is coaxially directed through a protrusion 60 and the interruptions to this beam of light can be calibrated and correlated to the rotor's speed, for example by a counter 65. The speed of rotor 18 can be accurately determined by the rotation of shaft 10 and its speed can be controlled by controlling the speed of motor 16.

In the alternative, the speed control of rotors 18 and 52 may be accomplished through the use of a magnetic recording signature in the same manner as is described in the above-mentioned Kalmus patent for controlling the speed of rotation of the rotors in the precusor device.

In order to insure that rotor 52 rotates freely with respect to rotor 18, an air bearing is provided in hub 20 of rotor 18. Shaft 10 is provided with an axial passage 70 which terminates in a branched T-passage 72 so that air under pressure can be passed through shaft 10 and out the openings 74 and 76 formed by the juncture of passage 72 and the peripheral surfaces of shaft 10. Suitable fittings 78 and 80 are provided to secure one end of air supply lines 82 and 84 thereto. Lines 82 and 84 are sufficiently flexible so that they do not provide a rigid connection between rotor 18 and shaft 10 and do not affect the forces imparted to the radial strands 36—42. Alternately, lines 82 and 84 can be deleted if ribs 32 and 34 are designed as flat hollow tubes which carry the air from the shaft 10 to rotor 18. The other end of lines 82 and 84 are secured by fittings 86 and 88, respectively, to rotor 18 and communicate with passages 90 and 92, respectively, thereby to allow fluid communication between passages 70—72 and 90—92. Each passage 90 and 92 includes a plurality of branched passages 94 which are oriented so as to direct the air under pressure to impinge upon the surface of bore 54 of rotor 52. Hence, the air under pressure provides an air bearing and insures relatively frictionless relative rotation between rotors 18 and 52.

It has also been found that by placing the two rotors so that they rotate about a common axis, rotor 52 carrying eccentric mass 58 can be made with a relatively small diameter so that the stability of the length of the radius arm from the center of rotation to the center of the eccentric mass 58 can be maintained. In addition, with the present construction, the tension of the wires which serve simultaneously as support for rotor 18 and as strain gauges can be adjusted easily.

Figure 3:
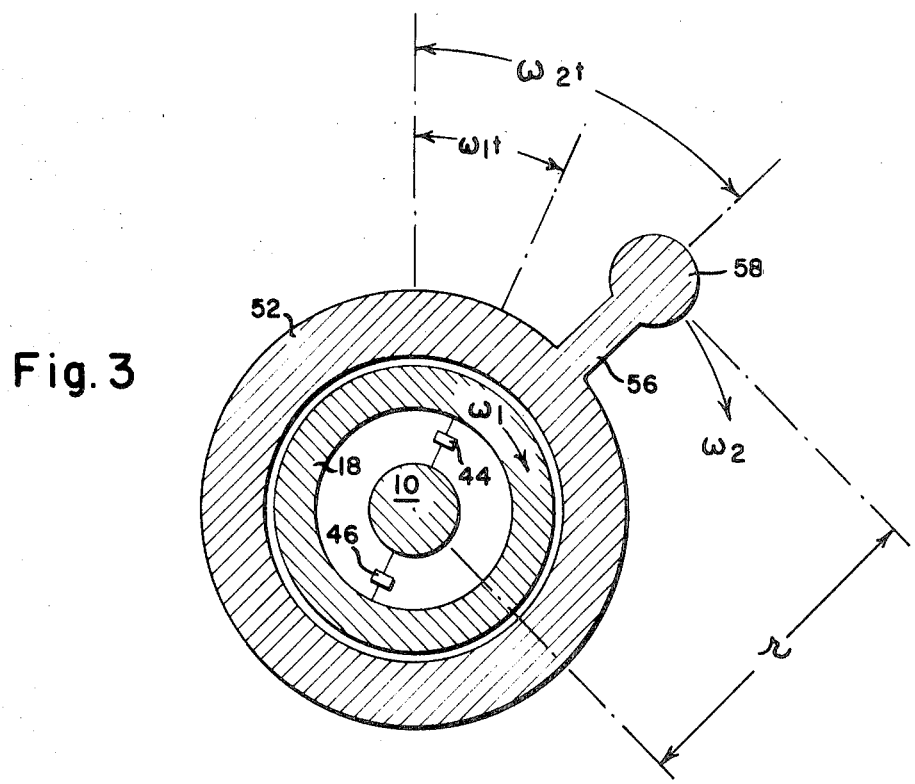
FIG. 3 is a representation of the mass system of the present invention showing the relationship between the two rotating members.

Reference is now made to FIG. 3, wherein there is shown a diagrammatic representation of the gravity meter of the present invention. The two rotors 18 and 52 are shown rotating about the common axle or shaft 10. Rotor 18 rotates with an angular velocity of $\omega_1$ and rotor 52 with an angular velocity of $\omega_2$. Rotor 18 carries two transducers 44 and 46 and the transducer outputs are combined in such a way that a positive voltage is obtained if transducer 44 is under pressure and a negative voltage is obtained if transducer 46 is under pressure and rotor 52 includes an extension to which is fixed a mass 58.

Let the mass of all movable parts (rotor 18 and rotor 52) be M and the mass of the extension 58 of rotor 52 be $m$. There are two forces acting on the transducers; $F_G$ due to gravity and $F_c$ due to centrifugal acceleration.

$$f/g = (M+m)g \cos\omega_1 t, \text{ and}$$
$$F_c = -m\omega_2^2 r \cos(\omega_2 - \omega_1)t,$$

where $r$ is the radius from the center of shaft 10 to the center of mass 58. For zero transducer output: $F_G = F_c$. Let $\omega_2$ be $2\omega_1$ and let $\omega_1 = \omega$.
Therefore:

$$(M+m)g \cos\omega t - 4m\omega^2 r \cos \omega t = 0 \text{ and:}$$
$$g = 4r\omega^2 m/M+m.$$

Since $r$, $m$ and $M$ are all constants and are fixed, an adjustment of the angular velocities $\omega_1$ and $\omega_2$ so that the transducer outputs are zero and $\omega_2$ is twice $\omega_1$ will result in an accurate determination of $g$, the acceleration due to gravity.

Figure 4:
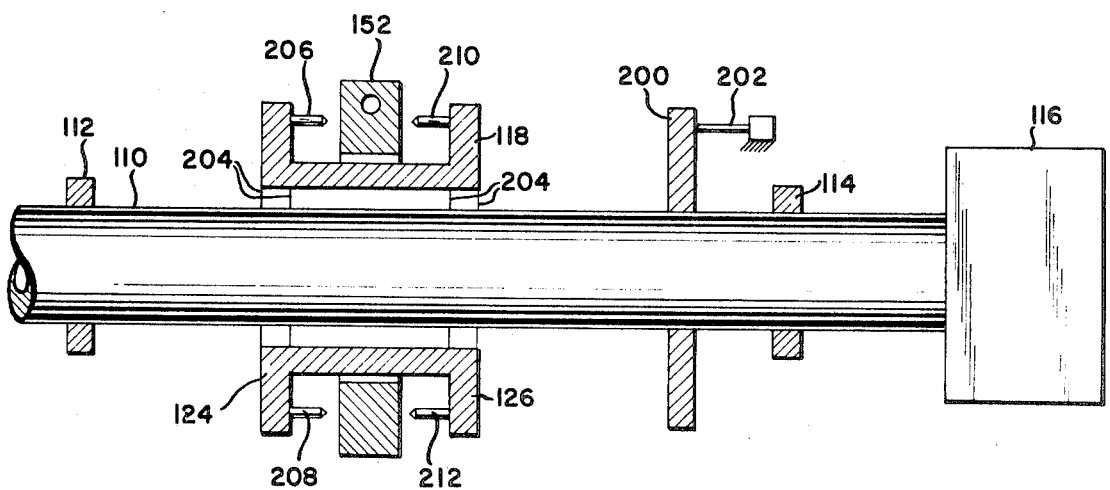
FIG. 4 is a vertical view, partly in section, showing an alternative embodiment for the rotor drive.

With reference now to FIG. 4, there is shown an alternative arrangement of the drive for concentric rotors 118 and 152 about drive shaft 110. Shaft 110, as is shaft 10 in the embodiment of FIG. 1, is journaled in bearing members 112 and 114 and is rotated therein by a motor 116 coupled thereto. A disk 200 is fixed about shaft 110 and carries a magnetic signature impressed thereon its surface. A transducer 202 is engaged to the disk 200 in contact with the magnetic signature and produces a signal with a frequency which is proportional to the angular velocity of shaft 110.

This signal is fed through connections in shaft 110 (not shown) and through wires 204 between shaft 110 and rotor 118 to transducers 206, 208, 210 and 212 which are positioned to extend inwardly from flanges 124 and 126 of rotor 118. On the radial surface of rotor 152 is a magnetic signature which is identical to the magnetic signature on disk 200. Transducers 206, 208, 210 and 212 are positioned to engage the magnetic signature on rotor 152. Hence, the signal imposed on the surface of rotor 152 by the transducers 206—212 will cause rotor 152 to rotate with respect to rotor 118 with an angular velocity which is equal to the angular velocity of rotor 118. Thus, if rotor 118 is rotating with an angular velocity of $\omega$ and rotor 152 rotates with respect to rotor 118 with the same angular velocity, then rotor 152 will rotate with an angular velocity of $2\omega$.

It is advantageous to produce a three-phase signal in transducer 200 for, in this way, the electrical connection between the sending and receiving transducers act like an electromechanical shaft. It is also best to keep the synchronizing signal very small and to amplify it by means of a transistor amplifier (not shown) within rotor 118. It is also to be understood that instead of using wires 204 as signal-carrying means, the signal and the amplifier supply voltage can be fed to rotor 118 by inductive means, by modulated RF energy or by a modulated light beam.

With reference again to FIG. 4, it is seen that rotor 152 is provided with a hole 220 which is bored therein along a portion of rotor 152. This hole is filled with a material which may be of a greater or lesser density than the material of rotor 152 and when so filled will cause the rotor to act like the unbalanced or eccentric mass 58 in the embodiment of FIG. 1. This alternative has the advantage that wind resistance to the rotation of rotor 152 is lessened.

It is thus seen that a dynamic gravity meter is provided which can be used to accurately determine the force due to gravity without regard to barometric pressure, thermal expansion of parts of the meter and the need for frequent calibrations.

We claim:

1. A gravity meter which utilizes centrifugal force of a magnitude that may be accurately determined with great precision to balance the gravitational force to be measured comprising:
   a. a first rotor having a fixed and known mass which is free to rotate in a single plane of rotation about a fixed point,
   b. a second rotor having a fixed and known mass including an eccentrically disposed mass, c. said second rotor being coaxially disposed about and supported by said first rotor and free to rotate in a single plane of rotation about said fixed point,
   d. first drive means for rotating said first rotor,
   e. second drive means for rotating said second rotor and said eccentric weight,
   f. control means for adjusting the angular velocities of said first and second rotors,
   g. transducer means supported by strands located between said first drive means and said first rotor for sensing the resultant component of gravitational and centrifugal forces acting in the direction of said strands on said first rotor,
   h. null-detecting means operatively connected to said transducer means whereby when said controlling means adjust the angular velocities of said first and second rotors to cause the centrifugal force acting on said first rotor to balance the gravitational force acting on said rotor, an AC null is indicated, and
   i. measuring means for measuring the angular velocity of said first rotor, the measurement providing an accurate and precise measure of gravity when said controlling means adjusts the angular velocities of said first and second rotors to produce an AC null in said transducer means.

2. A gravity meter as described in claim 1 wherein said drive means to rotate said first rotor comprises a variable speed motor connected to a drive shaft, said drive shaft being connected to said first rotor and wherein said fixed point lies along the axis of said drive shaft.

3. A gravity meter as described in claim 1 wherein said drive means to rotate said second rotor comprises an optical drive system,
  a. said system including a plurality of circumferentially spaced protrusions around the perimeter of said second rotor,
  b. each said protrusion having at least one radially directed surface which is blackened so as to absorb radiation with the remaining surfaces being nonradially directed and highly polished so as to reflect radiation,
  c. a random source of radiation directed to impinge on said protrusions whereby said blackened surfaces absorb radiation and said polished surfaces reflect radiation thereby to cause a reactive force of the ambient gas molecules near said blackened surfaces to cause said second rotor to rotate.

4. The gravity meter as described in claim 3 wherein said random source of radiation comprises a plurality of randomly directly light sources disposed so as to flood said protrusions with light from all directions.

5. A gravity meter as described in claim 4 wherein said means to control the angular velocity of said second rotor comprises means to vary the intensity of radiation emanating from said sources of radiation thereby to vary the reactive forces of said ambient gas molecules tending to rotate said second rotor.

6. Apparatus as described in claim 3 including means to accurately determine the angular velocity of said second rotor comprising a coaxially directed beam of light on one side of said second rotor directed to impinge on the periphery of said second rotor and a counter on the other side of said rotor in line with said beam of light, said counter being adapted to count and correlate the frequency of the interruptions to the beam of light caused by the rotation of said second rotor thereby to indicate the angular velocity of said second rotor.

7. A gravity meter as described in claim 1 wherein said drive means to rotate said second rotor comprises,
  a. a disk fixed to said drive shaft having a magnetic signature on its surface,
  b. first transducer means in contact with said magnetic signature and operable to generate a frequency responsive to the angular velocity of said drive shaft,
  c. a magnetic signature on said second rotor identical to the magnetic signature on said disk,
  d. transducer means on said first rotor in contact with said magnetic signature on said second rotor,
  e. said transducer means on said first rotor being operably coupled to the signal output of said first transducer means thereby to impress said signal on said second rotor whereby said second rotor rotates with respect to said first rotor at an angular velocity equal to the angular velocity of said drive shaft.

8. A gravity meter as described in claim 1 wherein said eccentrically disposed mass on said second rotor comprises a bore within a portion of said second rotor which is filled with a material having a density greater than the density of the material on said second rotor.